April 26, 1955   J. RINNE   2,706,970
HIGH COMPRESSION IGNITION INTERNAL COMBUSTION ENGINES
Filed March 4, 1952   9 Sheets-Sheet 8
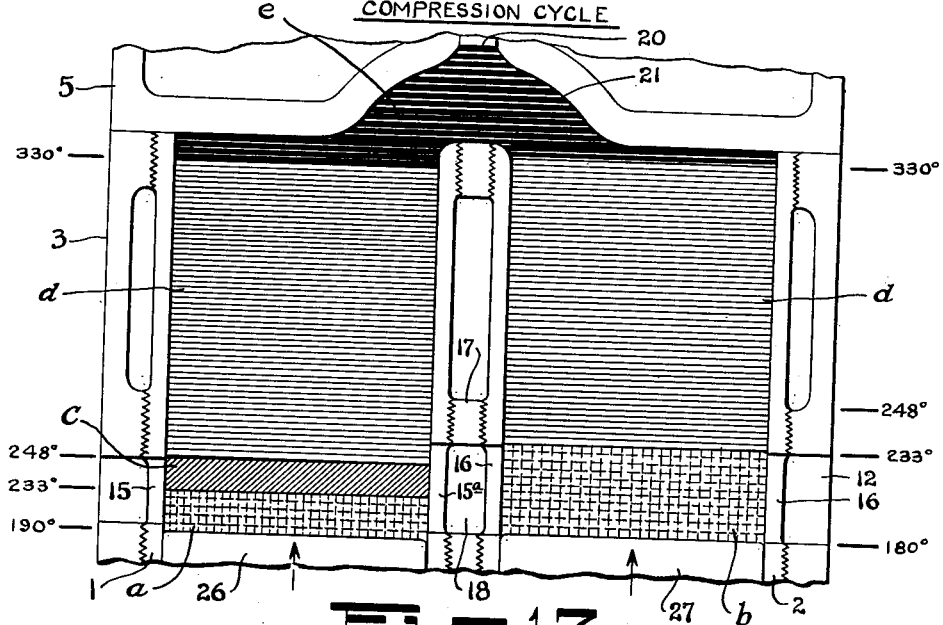
Fig.16 — COMPRESSION CYCLE
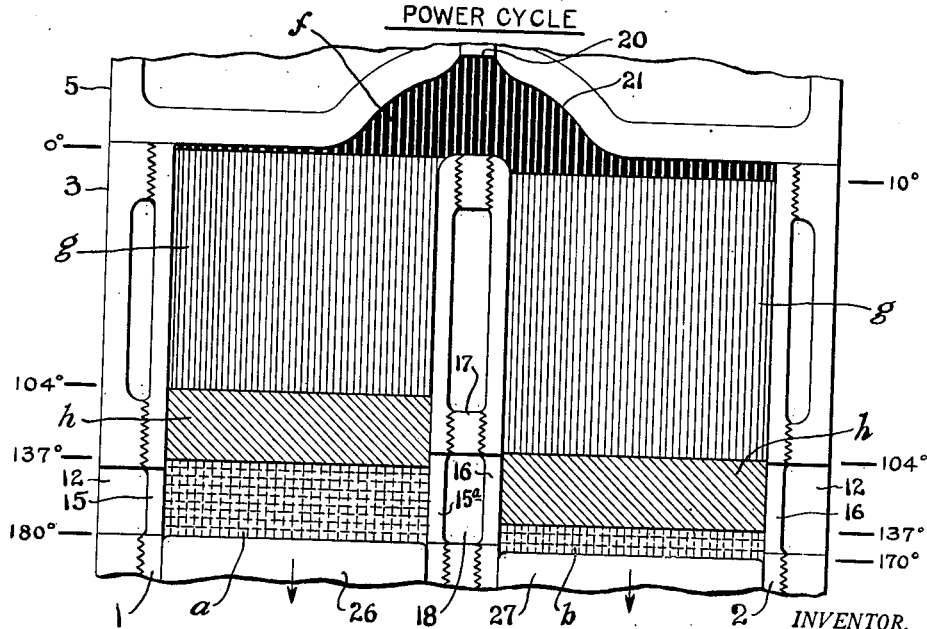
Fig.17 — POWER CYCLE
INVENTOR.
JOHN RINNE
BY
ATTORNEY April 26, 1955  J. RINNE  2,706,970
HIGH COMPRESSION IGNITION INTERNAL COMBUSTION ENGINES
Filed March 4, 1952  9 Sheets-Sheet 9
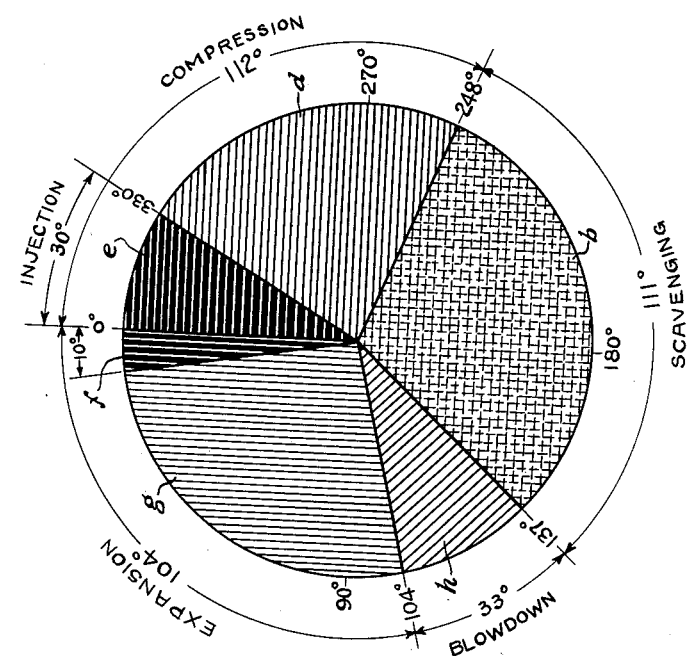
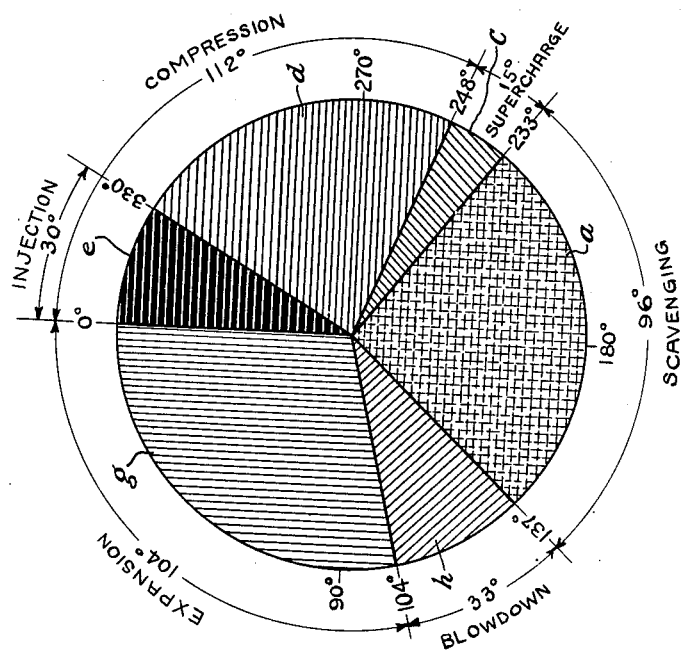
INVENTOR.
JOHN RINNE
BY
ATTORNEY

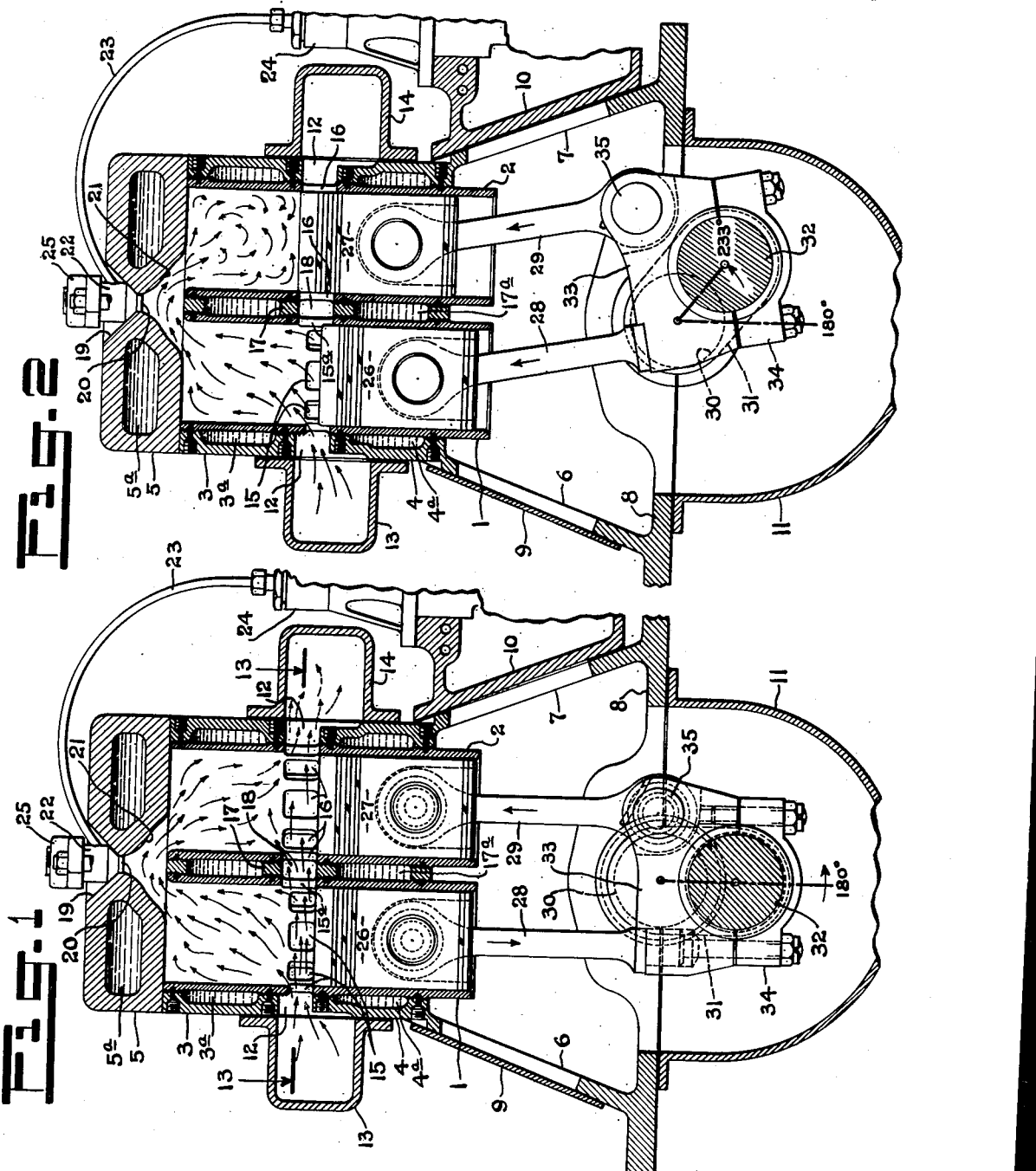

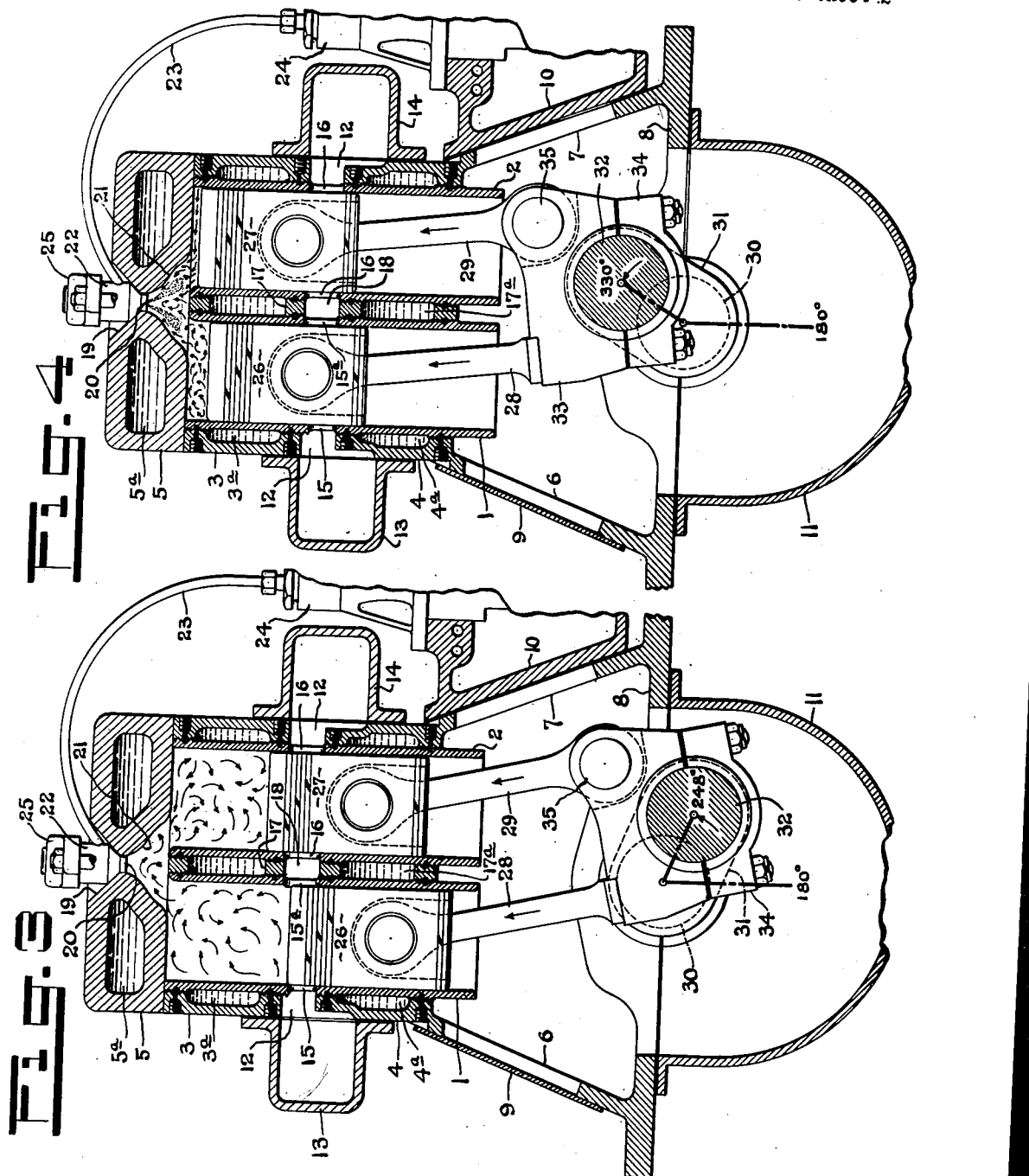

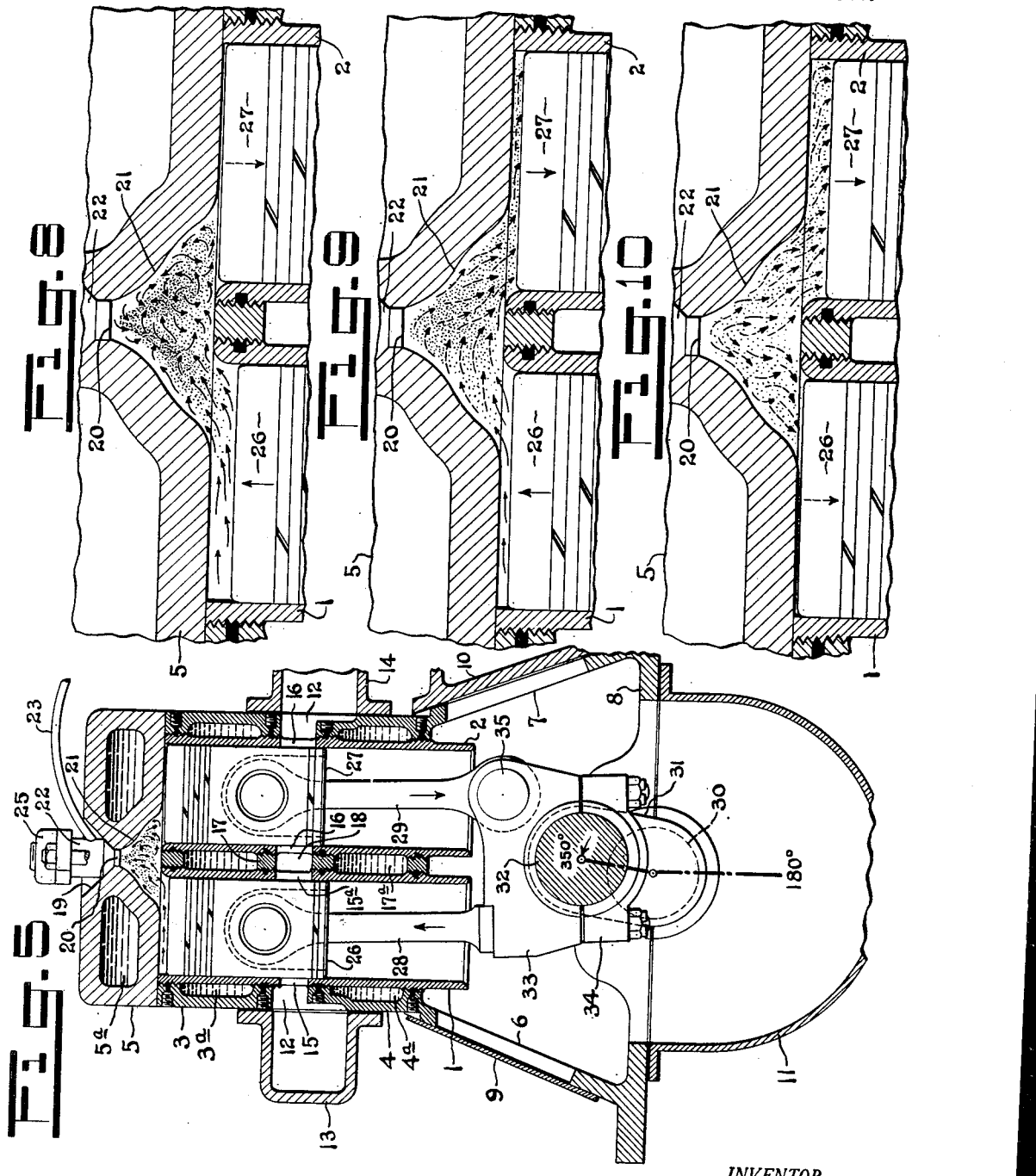

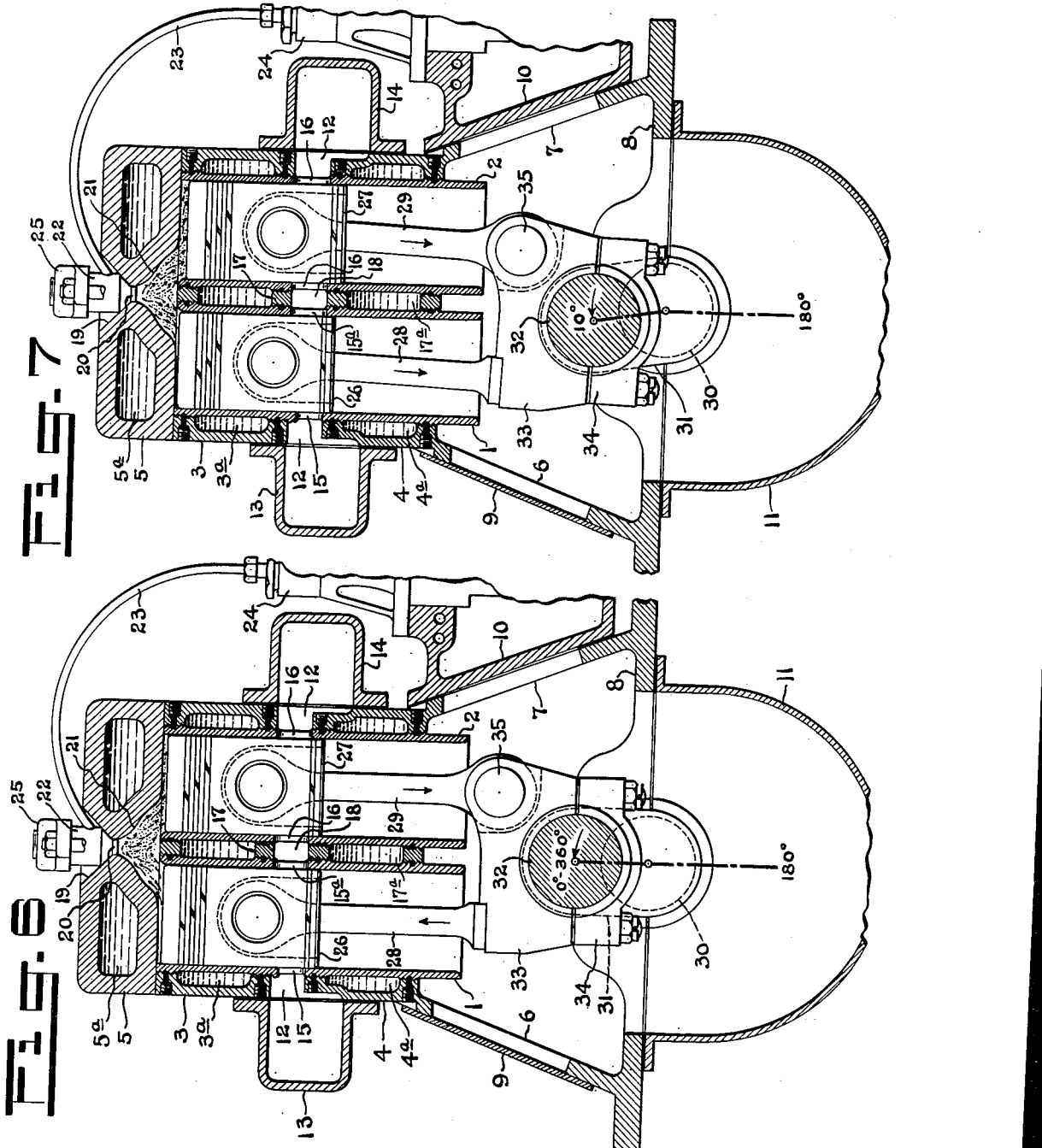

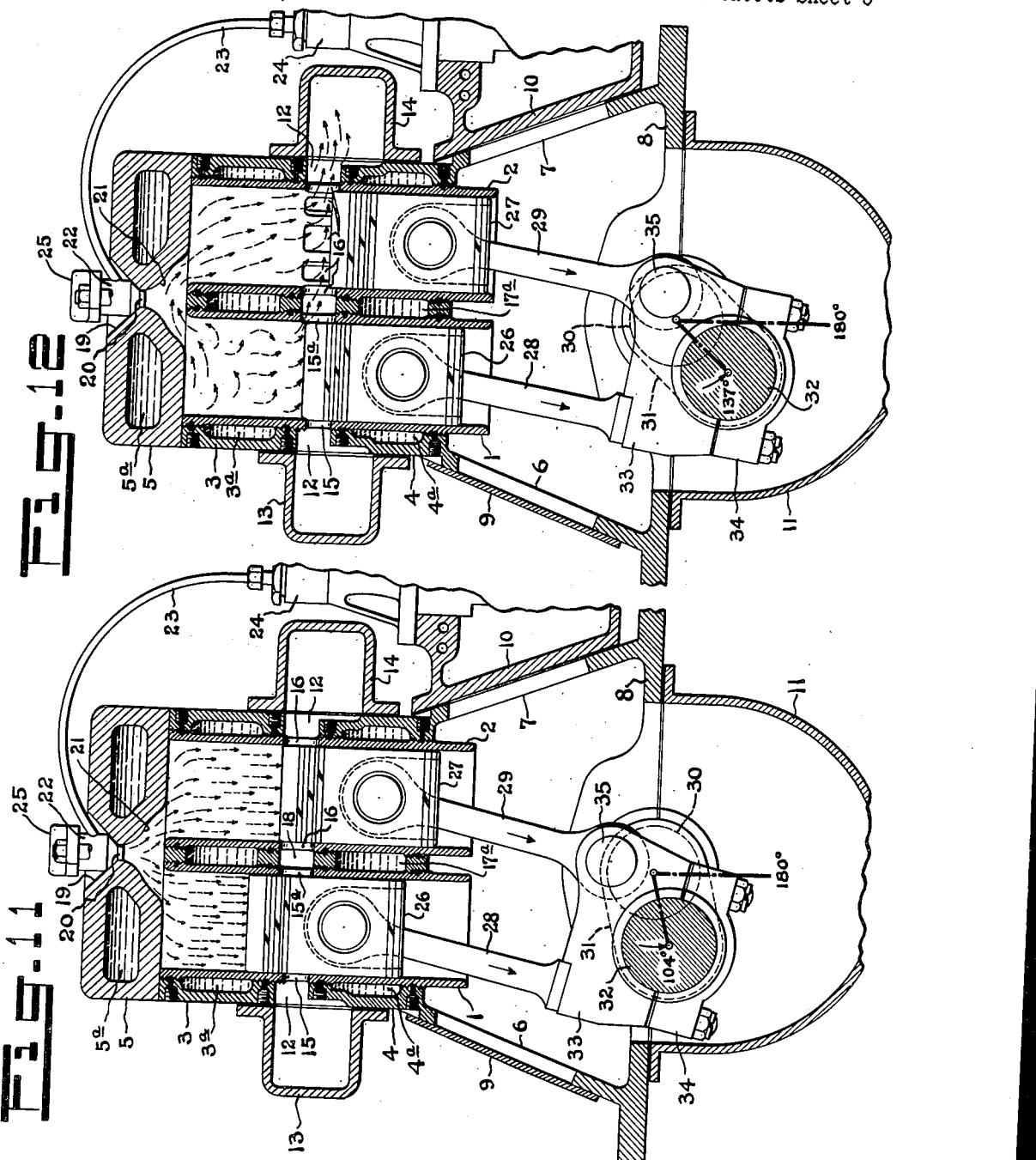

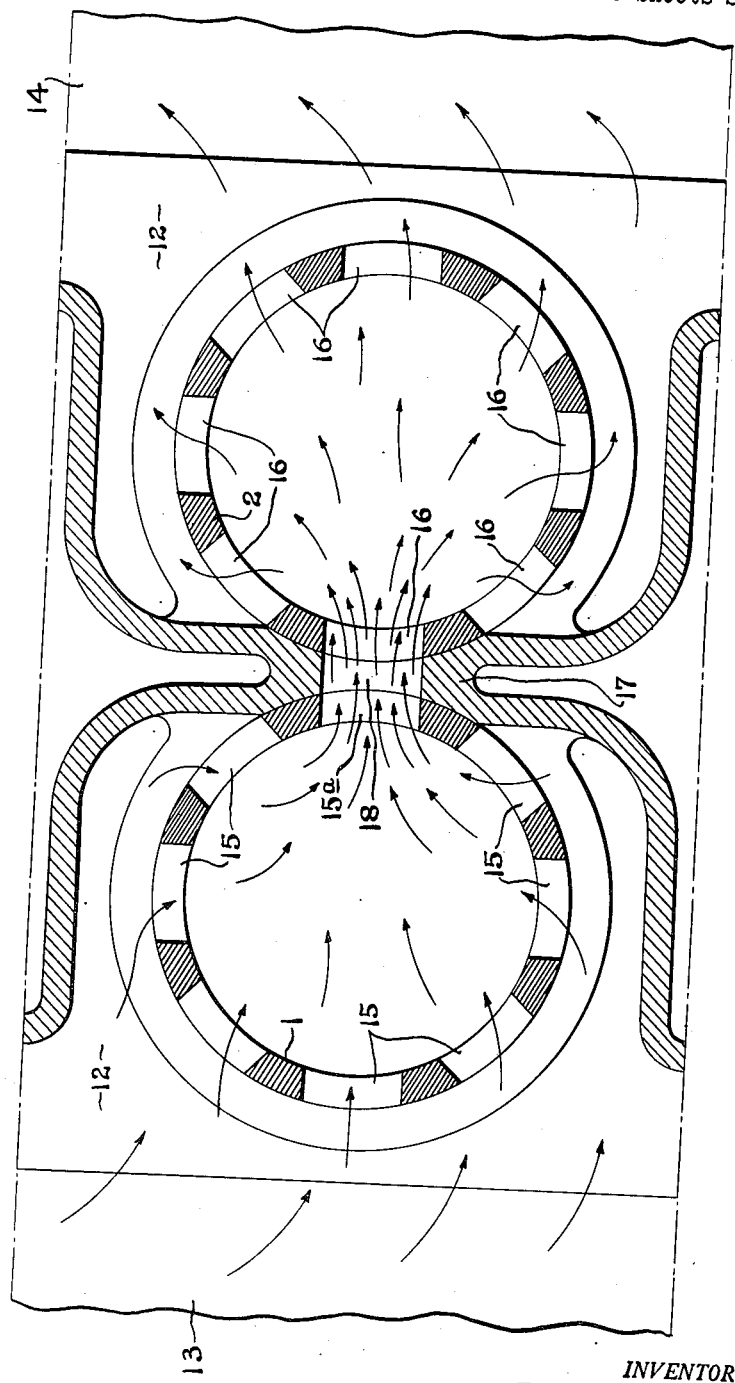

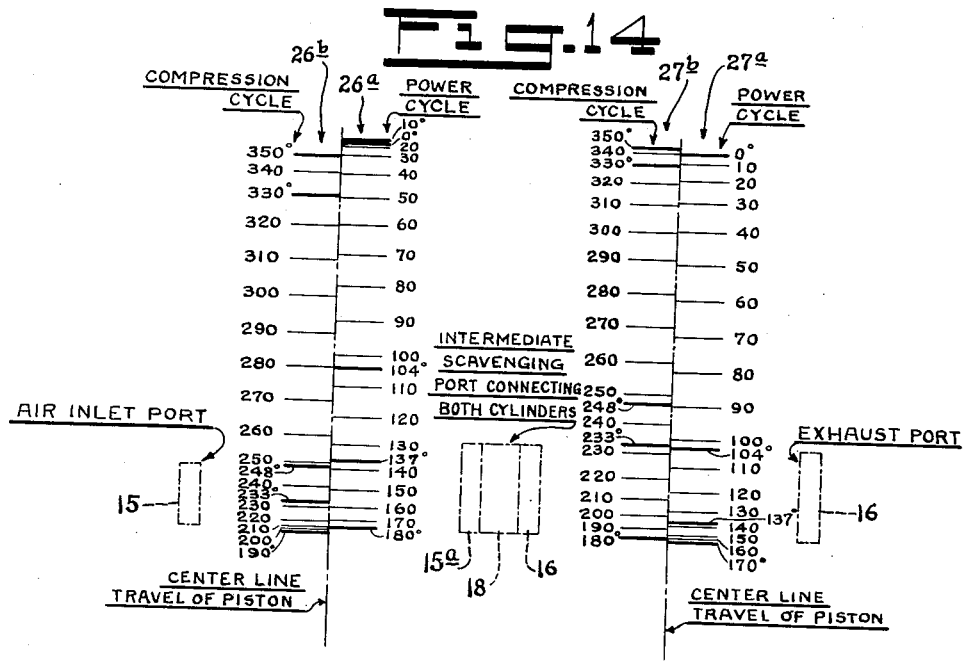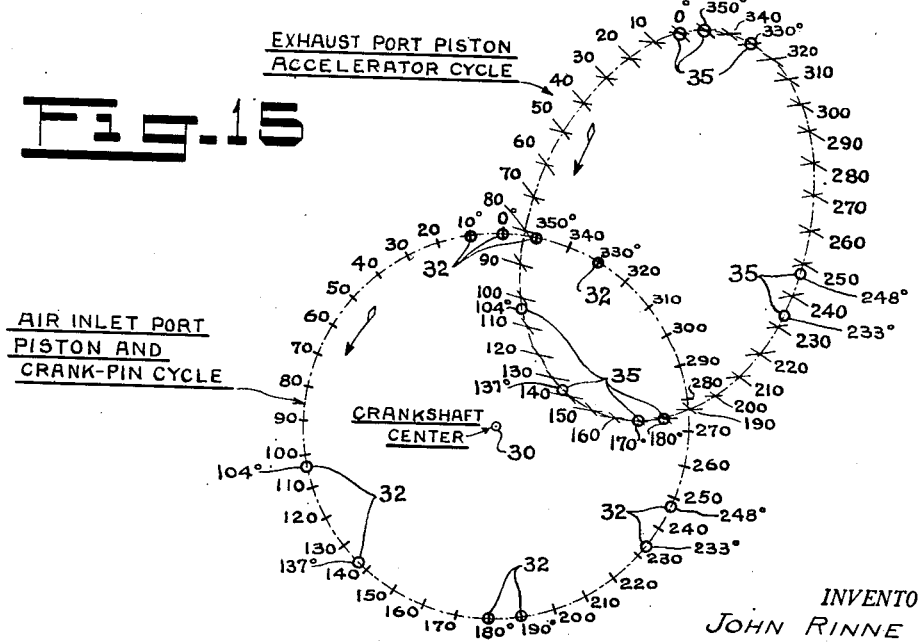

United States Patent Office 2,706,970
Patented Apr. 26, 1955

2,706,970

HIGH COMPRESSION IGNITION INTERNAL COMBUSTION ENGINES

John Rinne, Huguenot, N. Y.

Application March 4, 1952, Serial No. 274,768

3 Claims. (Cl. 123—53)

The invention relates to engines in which air is highly compressed within the cylinder by the piston and into which compressed air a combustible medium is injected and ignited by the heat of the compressed air to create the expansive force for imparting the power stroke to the piston, and more particularly the invention relates to two-stroke-cycle engines of this type.

The objects of the invention are to provide high air compression and the injection of the combustible medium directly into the compressed air in a finely divided or atomized state; to create a high degree of air turbulence during the supercharging, compression and fuel injection periods, and after initial ignition without the employment of auxiliary means; to obtain complete exhaust of the burnt gases and complete scavenging by the admission of fresh air for blowing through the cylinders before closure of exhaust ports; to obtain effective air supercharging before the start of the compression stroke of the pistons; to dispense with cylinder admission and exhaust valves and the operating and timing mechanism required for such valves; to simplify the design and decrease the liability of the cylinder head fracturing, and to afford greater facility of removal of the head when necessary; to reduce the overall dimensions of the engine and length of the crank-shaft for a given horsepower; to avoid excessive side thrust of the pistons and consequent uneven wear of cylinder walls and thereby avoid the escape of gases around the pistons during both power and compression strokes; to obviate the usual dead-center effects at the ends of the piston strokes in either direction and thereby reduce shock and vibration and the size and weight of the fly-wheel.

In carrying the invention into effect I provide an engine having one or more power units, each unit comprising a pair of cylinders of equal diameter mounted astride the crank-shaft, the pistons of each unit operating in unison with the piston-rods in parallel relation and applying power strokes simultaneously to an individual crank-arm for each unit by means of a single crank-block for each unit swivelled on its individual crank-pin; the piston-rods of each unit being separately coupled in spaced relation to the crank-block which serves as a yoke for the pair of piston-rods, and in the preferred arrangement one rod of each pair of piston-rods is rigidly connected to the yoke-block and the other is hinged thereto. Thus with such arrangement of cylinders in pairs astride the crank-shaft, the pistons and piston-rods of a unit can never be in top or bottom dead-center alignment with its crank-arm, and thereby entirely eliminating the usual dead-center effects.

The cylinders of each unit pair are provided with inlet and exhaust ports, the inlet ports being all in one cylinder of each pair, which herein are referred to as the inlet cylinders, and the exhaust ports are all in the other cylinders of each pair, hereinafter referred to as the exhaust cylinders. These ports are located circumferentially in the walls of and about midway the length of the cylinders, and between the adjacent inlet and exhaust ports of each unit pair of cylinders a communicating passage is provided in the cylinder block, the lower edges of the ports and connecting passage of each pair of cylinders being in horizontal alignment. The exhaust ports and the connecting passages are preferably of the same height and extend above and are of larger area than the inlet ports with the exception of the inlet port registering with the connecting passage which is of the same height and area as the connecting and exhaust ports.

The lower edges of each series of ports and the connecting passages are on a line immediately above the tops of the piston-heads of each unit pair when at the end of the power strokes, and the ports are in direct horizontal alignment between the air inlet and exhaust ducts thereby affording direct blow through for the scavenging action. The incoming air from the supply duct is under pressure and as it enters the inlet cylinder the air current divides, part rushing upward through the inlet cylinder and the chamber in the cylinder-head and down through the exhaust cylinder and out through the exhaust ports, and simultaneously the direct flow through the cylinder ports and communicating passage creates a suction effect which facilitates the flow upward and downward through the cylinders thereby effecting complete evacuation of the burnt gases from both cylinders of each unit pair regardless of the conformation or capacity of the combustion chamber.

The inlet and exhaust ports are covered and uncovered by the reciprocation of the pistons, and the relative timing and duration of the covering and uncovering periods of the ports of each pair of cylinders is governed by the relative locations of the crank-pin and hinge-pin centers of the yoke-block of each pair of cylinders and the degree of eccentricity of the hinge-pin centers relative to the crank-pin centers.

The crank-pin yoke-block for each pair of cylinders is of a width to provide piston-rod coupling thereto in spaced parallel relation, and the axial centers of the hinge-pins for the exhaust cylinder piston-rods of each unit pair are at identical points on the yoke-blocks and eccentric with relation to the crank-shaft and crank-pin centers so that in operation as the crank-pin of each crank-arm revolves in a path concentric to the axis of the crank-shaft, the hinge-pin centers of the hinged piston-rods revolve in identical elliptical paths eccentrically to the crankshaft axis. And the relative orbits of the crank-pin and hinge-pin centers of the yoke-block govern the timing and duration of the port covering and uncovering periods.

The purpose of this arrangement of the piston-rods and yoke-block connections is to provide without auxiliary mechanism for the timing of the covering and uncovering of the inlet and exhaust ports for the several periods of operation, and to provide in the exhaust cylinder of each pair an advance movement of the pistons both at the beginning of the power strokes and at the beginning of the return or compression strokes, and at a slightly accelerated and decelerating rate of movement relative to the pistons of the inlet cylinders. The advance movement of the pistons of the exhaust cylinders accelerate toward the exhaust ports during the power strokes to effect the uncovering of the ports for the blow down of the exhaust action before the start of the uncovering of the ports of the inlet cylinders, and then decelerate toward the end of the power strokes to level off the piston tops for the full uncovering of both inlet and exhaust ports for the final blow through during the scavenging period. On the return stroke of the pistons for the compression strokes, the pistons of the exhaust cylinders move in advance of the pistons of the inlet cylinders to effect the covering of the exhaust ports while the inlet ports remain uncovered for the supercharging period, and the reverse acceleration and deceleration takes place for the supercharging and compression action.

This functioning of the yoke-block and the eccentric location of the hinge-pins, and the relative movements of the pistons of each unit pair of cylinders caused thereby, serves a fourfold purpose. First, on both strokes of each pair of pistons it serves to control the relative uncovering and covering of the exhaust and inlet ports of the cylinders at a rate to effect the desired timing for the several periods of operation. Second, on the return or compression strokes of each pair of pistons the accelerated and decelerated movement of the exhaust cylinder pistons relative to the inlet cylinder pistons cause a circulation or eddying of the incoming air within the cylinders during the supercharging and compression periods thus creating the highly desired turbulence of the air in both cylinders of each unit pair and especially within the combustion chamber at the cylinder-heads for effective mixing of the air and fuel during the injection periods. Third, at the end of the compression strokes, when the yoke-block is in its balanced or upper dead-center position, the tilting or swivelling movement of the yoke-block as it passes over the dead-center point causes the start of the advance return or power stroke of the exhaust cylinder piston and imparts a final upward drive to the inlet cylinder piston thereby forcing the compressed air and injected fuel spray across the combustion chamber thus creating greater turbulence and thorough mixing of the air and fuel for complete combustion. Fourth, at the end of the power stroke, after the start of the exhaust, as the yoke-block approaches its lower dead-center balanced position, that is, during the interval between exhaust and scavenging actions, a final downward impulse is imparted to the pistons of each pair of cylinders so that the yoke-block at the lower dead-center balanced position will effect the levelling of the tops of the pistons at the lower edges of the inlet and exhaust ports for a straight blow through of air from the inlet duct to effect thorough scavenging especially in engines operating at high speeds.

A single cylinder-head is preferably provided for each pair of cylinders. These heads are flat on the upper surfaces and of a length to cap both cylinders of each unit pair and of a height to provide internal passages or chambers for cooling fluid. Each head has a central conical top bore terminating in a circular bore for receiving and seating a fuel spray nozzle, and on the under or inner side a larger central approximately conical or dome-shaped chamber is formed having a smooth surface without recesses or pockets to provide a clear unobstructed space for fuel spray, air circulation and combustion area. This dome-shaped chamber is curved outward toward the rim so as to extend over both cylinders approximately from center to center of the cylinders to provide a passageway for the flow of air and fuel mixture back and forth from one cylinder to the other.

In normal operation a constant pressure is maintained in the fresh air duct communicating with the ports of the inlet cylinder of each unit pair and the admission of air successively to each unit for scavenging and supercharging is effected solely by the reciprocation of the pistons of the inlet cylinders and controlled by the functioning of the yoke-blocks. For the exhaust duct no valves are employed other than the reciprocating pistons of the exhaust cylinders, and the covering and uncovering of the exhaust ports are timed and controlled by the action of the yoke-block. The fuel injection is timed and controlled from the crank-shaft in the conventional manner.

From the foregoing description it will be observed that no valves are employed for the air inlet and exhaust as distinguished from the functioning of the pistons, thereby obviating perforations in the cylinders or cylinder-heads for valves or valve-stems and eliminating extra cylinder area for valve seats and dispensing with operating shafts, cams and other mechanism for operating such valves, and thereby decreasing the overall dimensions and weight of the engine and affording a decreased length of crankshaft for any given number of power units. Thus greatly improved operation and efficiency due to constantly uniform timing of the several periods; thorough exhaust and scavenging regardless of the form or capacity of the combustion chamber and without the employment of auxiliary mechanism; greatly decreased cost of manufacture and maintenance; and greater facility for overhaul, repair and inspection are obtained.

The invention is illustrated in the accompanying drawings by a pair of cylinders operating as a single power unit or as one of the power units of an engine comprised of any number of power units of identical capacity, length of stroke, and identical inlet and exhaust port arrangement, and each unit being coupled to separate identical crank-arms which are spaced angularly on the crank-shaft to impart the successive power-strokes from each pair of cylinder units, and in which—

Figures 1 to 12 are central vertical sectional views through a pair of cylinders mounted astride the crankshaft, and in which views the piston and piston-rod coupling to the crank-shaft illustrate in successive positions the movement of the pistons and crank-arm through a cycle of 360°. Figure 1 shows the position at full downward or power stroke and full uncovering of the inlet and exhaust ports of the cylinders, the arrows indicating the inlet and exhaust flow and complete blow through scavenging action, and also showing the piston-rod yoke-block in its balanced lower dead-center position at the end of the downward or power stroke as indicated by the arrow on the piston-rod of the inlet cylinder piston and also indicating the start of the advanced upward stroke of the piston of the exhaust cylinder as indicated by the arrow on its piston-rod. Figure 2 shows a 53° movement of the crank-arm from the position of Figure 1 and indicating the advance and accelerated movement of the piston of the exhaust cylinder and at which point the exhaust ports are fully covered and the inlet ports still open to admit the fresh air supercharge. Figure 3 shows a 68° movement of the crank-arm from the position of Figure 1 at which point the air inlet and exhaust ports are fully covered for the beginning of the compression stroke and showing the continued advance movement of the piston of the exhaust cylinder thereby causing a backward movement of the air flow between the cylinders through the combustion chamber under the cylinder-head and creating the eddying of the air current and beginning of the desired air turbulence. Figure 4 shows a 150° movement of the crank-arm from the position of Figure 1 and a continued advance movement of the piston of the exhaust cylinder but at reduced rate and the arrows indicating increased air turbulence within the combustion chamber, and also showing the start of fuel injection. Figure 5 shows a 170° movement of the crank-arm from the position of Figure 1. At this point the piston of the exhaust cylinder is at the end of its advanced upward or compression stroke leaving a slight clearance space between the piston and cylinderhead; the piston of the inlet cylinder being lower down on its upward or compression stroke and the compressed air and fuel mixture having been driven through the combustion chamber into the clearance space above the piston of the inlet chamber thus continuing the turbulence and effecting thorough air and fuel mixture; and showing the yoke-block in the position preceding its tilt over the upper dead-center point of the crank-pin, and the start of the advance downward or power stroke of the piston of the exhaust cylinder as shown by the arrow on its piston-rod. The position of the pistons and yoke-block in this figure represent the movement immediately preceding the final upward thrust of the piston of the inlet cylinder as shown by the arrow on its piston-rod as the yoke-block tilts over the upper dead-center position for effecting the further increase in turbulence of the mixed compressed air and fuel as it is driven back again through the combustion chamber and into the clearance space above the piston of the exhaust cylinder and effecting initial ignition as the piston starts downward for the beginning of the power stroke. Figure 6 shows a 180° movement of the crankarm from the position of Figure 1. In this position of the pistons the crank-arm is in its upper dead-center position with the yoke-block in its upper balanced position, and as the yoke-block moves with the crank-arm beyond the dead-center position, the piston-rod of the exhaust cylinder is drawn downward slightly by the swivelling motion of the yoke-block and causes the further upward compression drive of the piston of the inlet cylinder as indicated by the arrow on its piston-rod to impart a final upward movement to its compression stroke and forcing the mixture of air and fuel across the combustion chamber thereby creating increased turbulence and complete fuel ignition. Figure 7 shows a 10° movement of the crank-arm beyond the top dead-center position after a complete fuel ignition and start of the power stroke by both pistons, and showing the lead movement of the piston of the exhaust cylinder and consequent slight upward tilt of the yoke-block from the position of Figure 6, and the arrows showing the increased turbulence of the air and fuel mixture as the relative movements of the pistons forces the mixture through the combustion chamber immediately preceding the start of the expansion stroke. Figures 8, 9 and 10 show on an enlarged scale the piston positions and movements corresponding to Figures 5, 6 and 7. Figure 11 shows a 104° movement of the crank-arm during the expansion or power stroke of the pistons and showing the increased lead of the piston of the exhaust cylinder due to the accelerated movement caused by the eccentric coupling of its piston-rod to the crank-arm yokeblock, and immediately preceding the uncovering of the exhaust ports for the blow-down action. Figure 12 shows a 137° movement of the crank-arm during the power stroke at which point the exhaust ports are near complete uncovering and the port of the inlet cylinder adjacent the exhaust passage between the two cylinders partly uncovered; the arrows showing the blow-down for the exhaust action from both cylinders and beginning of the scavenging action from that point through the position of the pistons indicated in Figure 1 to a point immediately preceding the position of the pistons in Figure 2. The full exhaust and scavenging action takes place during a crank-arm movement of approximately 129° from the position of the pistons shown in Figure 11 through the positions shown in Figures 12 and 1 to the position shown in Figure 2 at which point the exhaust ports are fully covered, or approximately 36 percent of the full cycle period.

Figure 13 is an enlarged cross-section on the line 13—13 of Figure 1 showing the registration of the inlet cylinder port with the communicating passage between the two cylinders and the adjacent port of the exhaust cylinder, the arrows indicating the air flow from the air inlet duct through the inlet cylinder and communicating passage to the exhaust cylinder for the blow through into the exhaust duct during the scavenging period.

Figure 14 is a table of the power and compression movements of the pistons of each unit pair of cylinders.

Figure 15 illustrates the relative circular and elliptical orbits of the crank-arm pin and the hinge-pin of the crank yoke-block; and Figures 16, 17, 18 and 19 are views illustrating the piston periods of the two strokes of each unit pair of pistons.

Referring to the drawings, 1—2 represent the cylinders of a unit pair of equal diameter mounted astride the crank-shaft in cylinder block sections 3—4, and 5 represents a single cylinder-head which covers both cylinders. The cylinder block sections 3—4 are mounted on base members 6—7 which are shown as formed integral with cylinder block section 4 and base member 8. Base members 6—7 are shown in the form of open walls having covers 9—10, and 11 illustrates the crank casing. The cylinder block sections 3—4 and cylinder-head 5 are formed with cavities 3a, 4a and 5a for circulating cooling fluid around and above the cylinders 1—2, and mounted on the cylinder block sections 3—4 at cylinder 1 and covering the circumferential space 12 between the block sections 3—4 is an air admission duct 13, and similarly covering space 12 at cylinder 2 is an exhaust duct 14. Cylinder 1 at its midsection and opening into the space 12 is provided with a series of radically aligned inlet ports 15 spaced circumferentially around the cylinder, as seen in Figure 13, and similarly arranged around cylinder 2 is a series of exhaust ports 16 but of greater height and area than the inlet ports 15 with the lower edges of both series of ports on the same level. The dividing wall 17 of the cylinder block is provided with cavities 17a for cooling fluid and at the midsection of wall 17 in alignment with the inlet and exhaust ports is formed a connecting port or passage 18 of the same height as exhaust ports 16 and which passage connects the adjacent exhaust port with the adjacent inlet port 15a which latter is taller than the other inlet ports and of the same height as the connecting passage and exhaust ports. The air supply and exhaust pipes and connections to ducts 13—14 and the blower for the air supply are not shown since the same may be of any conventional arrangement.

The cylinder-head 5 as shown is flat at its outer top surface and is provided with a central opening on the top side having a conical bore 19 and a circular bore 20 opening into a relatively larger bore 21 on the inner side of the head forming a fuel spray and combustion chamber having a smooth surface and unobstructed and unrestricted area for the free flow of the air and fuel mixture. The dimensions of the combustion chamber are such as to provide a cubical area sufficient to contain the compressed air from both cylinders and the conformation of the chamber is such as will permit maximum air turbulence. Into the conical bore 19 and circular bore 20 is seated the fuel spray head or nozzle 22 for fuel injection, and to which is coupled fuel supply pipe 23 extending from fuel injector 24. The fuel spray nozzle is bolted to the cylinder-head by a bracket 25, and the injector 24 is mounted on a bracket extension from cover member 10.

The pistons 26—27 are of the conventional trunk piston type having piston-rods 28—29 coupled to the pistons by the usual pin, and each piston being provided with the usual expansion rings. It will be noted that the pistons have the same length of stroke and both have preferably flat tops and both adapted to afford sharp and symmetrical covering and uncovering of the cylinder ports 15—16.

The crank-shaft is indicated at 30, the crank-arm (in dotted lines) at 31, and the crank-pin at 32. The crank-block is in the form of a yoke 33 journalled on the pin 32 by a cap 34 secured to the yoke by bolts. This crank-block yoke is of a width to permit coupling the piston-rods 28—29 thereto in parallel relation. The piston-rod 28 coupled to piston 26 in the cylinder having the inlet ports 15 is rigidly connected with the yoke 33 either by being formed integrally therewith or by screw-threaded connection so that with the reciprocation of its piston the swing of the crank-pin 32 will be in a circle concentric with the crank-shaft 30. The piston-rod 29 which is coupled to piston 27 in the cylinder having the exhaust ports 16 is hinged to the yoke 33 by a pin 35 which is located slightly eccentric in relation to the crank-shaft and crank-arm pin centers, so that while the piston-rods are maintained substantially in parallel relation by the yoke, the yoke hinge-pin 35 travels in an elliptical path in unison with the crank-arm pin 32 travelling in a circular path concentric with the crank-shaft as indicated in Figure 15. This difference in travel of the crank-arm pins 32 and 35, while resulting in equal lengths of reciprocation of the pistons through the connecting rods, causes the piston 27 to start its upward and downward strokes in advance of piston 26, and effects a gradual acceleration and deceleration of piston 27 toward and away from the midsection of cylinder 2 in both strokes as indicated by the table of movement in degrees in Figure 14.

In Figures 1 to 7, 11 and 12, the direction of rotation of the crank-shaft and crank-arm is indicated by the arrows. In Figure 1 the pistons are shown at the limit of the downward stroke or bottom dead-center position of the yoke-block, and showing the full uncovering of the air admission ports of cylinder 1, the exhaust ports of cylinder 2, and the connecting port 18. In this position the flat top piston-heads are shown levelled off by the tilting of the yoke 33 to the lower dead center point imparting an upward stroke to the piston-rod 29 as indicated by the arrow on the rod. The arrows within the cylinders indicate the straight blow through the incoming scavenging air flow from air supply duct 13 directly through the admission ports 15 and 15a of cylinder 1, the connecting port 18 and through the larger exhaust ports 16 in cylinder 2 to the exhaust duct 14 as illustrated in Figure 13. This straight blow through under pressure from duct 13 passing through inlet ports 15 of smaller area than the ports 15a, 18 and 16 to the large exhaust duct 14 creates a suction effect and draws the products of combustion downward in cylinder 2 as indicated by the arrows in Figure 1. Also the arrows show the air flow upward through cylinder 1 and through the combustion chamber 21, which forms an unobstructed passage way throughout the width and length of the combustion chamber from approximately center to center of cylinders 1—2, and the air flow continues into and downward through cylinder 2 and out through exhaust ports 16 into exhaust duct 14 as indicated in Figures 1 and 12. Thus a thorough and complete blow down and exhaust of the products of combustion is effected during a period of crank-arm movement beginning with the start of blow down and exhaust by the uncovering of the exhaust ports 16 immediately following the downward movement of piston 27 beyond the point shown in Figure 11, followed by the greater opening of ports 16 and the uncovering of ports 15a and 18 by the downward movement of the pistons 26 and 27 toward the point shown in Figure 12 where the exhaust action continues as indicated by the arrows showing the flow downward in cylinder 1 through ports 15a and 18 to exhaust ports 16, and upward out of the top open end of cylinder 1 and through the combustion chamber 21 and down through cylinder 2 and out through the exhaust ports 16 to the exhaust duct 14. The continued downward movement of the pistons to the point shown in Figure 1 results in the full uncovering of ports 15, 15a, 18 and 16 and the beginning of the blow through for the scavenging action by the constant air pressure from duct 13, and the scavenging action continues until the piston 27 reaches the point in the upward stroke shown in Figure 2 in advance of piston 26 at which point the exhaust ports 16 are fully covered to complete the exhaust and scavenging periods, and the continued flow of fresh air from duct 13 to both cylinders as indicated by the arrows in Figure 2 begins the supercharging of the pair of cylinders preparatory to the beginning of the compression period.

The compression period by the pair of pistons begins when the pistons reach the point shown in Figure 3 where all admission and exhaust ports are covered by the pistons and both cylinders are charged with fresh air from duct 13 at blower pressure, and the arrows show the air movement and turbulence within the cylinders and through the combustion chamber 21 caused by the advance and accelerated movement of piston 27. When the pistons reach the position shown in Figure 4 fuel injection into the chamber 21 begins, and due to the high degree of air turbulence caused by the difference in the rate of movement of the pistons, the piston 27 first forcing the air from the clearance space of cylinder 2 into the clearance space of cylinder 1 as indicated by the arrows in Figure 4, and this action is followed by the mixture being driven back from cylinder 1 to cylinder 2 due to the advance downward movement of piston 27 and the continued upward movement of piston 26 as indicated by the arrows in Figures 5 to 10. Thus an effective and thorough mixture of the compressed air and finely atomized fuel is produced for ignition and combustion. The compression period continues through the movement of the pistons from the position shown in Figure 4 to the point shown in Figures 5 and 8 where the initial fuel ignition is effected as indicated by the arrows in the fuel spray and combustion chamber 21.

As the crank-arm moves to the top dead-center position indicated in Figure 6 greater turbulence is created as the partially ignited air and fuel mixture is driven across the combustion chamber 21 as indicated by the arrows in Figures 6 and 9 due to the movement of the pair of pistons to the normal limit of upward movement by the crank-arm. As the crank-arm is carried 10° over the top dead-center point by the momentum of the fly-wheel (not shown) in a single power unit engine or by the successive power drives of a multiple unit engine, a final upward drive is imparted to the piston 26 as the yoke-block 33 tilts to the position shown in Figure 7 and the piston 27 starts downward for the beginning of the power drive. In this movement of the pistons from the point of initial fuel ignition indicated in Figure 6 to the point of complete fuel ignition indicated in Figure 7 a still greater turbulence of the fuel mixture is created by the final upward drive of piston 26 and the force of combustion drives both pistons downward for the power stroke indicated in Figures 7 and 10. From this point, by reason of the eccentric relation of the yoke-block pin 35 to the crank-arm pin 32, the piston 27 continues to advance over the downward movement of piston 26 at an accelerated rate as indicated in Figures 11 and 14, and then the rate of movement of piston 27 begins to decelerate as it is about to begin the uncovering of the exhaust ports, and this deceleration continues as indicated in Figure 12 for the blow down and exhaust period to the point of levelling off of the pistons for the full uncovering of the exhaust and inlet ports for the blow through and scavenging period indicated in Figure 1. The final blow through and scavenging action is illustrated in the enlarged cross-section of the cylinders in Figure 13.

In Figure 14 the relative rate of travel of the pistons is illustrated in degrees by four columns of light and heavy lines representing the compression and power strokes of the inlet and exhaust cylinder pistons. The two columns at the left indicate in scales 26ᵃ and 26ᵇ the power and compression strokes, respectively, of piston 26, and the two columns at the right indicate in scales 27ᵃ and 27ᵇ the power and compression strokes, respectively, of piston 27 of each pair of pistons. Thus in scales 26ᵃ and 27ᵃ it will be observed that the heavy lines at the top of the scales marked zero indicate the relative positions of pistons 26 and 27 at the end of the normal compression stroke and corresponding to the positions shown in Figures 6 and 9, at which points, respectively, fuel ignition occurs and expansion starts. The heavy line marked 10° in scale 26ᵃ indicates the position of piston 26 corresponding to the position shown in Figures 7 and 10 where the crank-pin 32 has moved 10° over the top dead-center point after the final upward drive beyond the normal compression stroke is imparted to piston 26 by the tilt of yoke-block 33 over the upper dead-center. The next heavy lines in scales 26ᵃ and 27ᵃ indicate the relative positions of the pistons when the crank-arm pin 32 of each power unit has rotated 104° beyond the upper dead-center point in the expansion period corresponding to the positions of the pistons as shown in Figure 11, and the scale mark 104° in scale 27ᵃ indicating the advance movement of piston 27 over piston 26 and at which point piston 27 begins the uncovering of the exhaust ports 16 for the beginning of the exhaust period. The next heavy lines of scales 26ᵃ and 27ᵃ indicate the point at which the piston 26 begins the uncovering of ports 15 and 15ᵃ and piston 27 approaches the point of complete uncovering of exhaust ports 16 and at which point the crank-arm pin 32 of each power unit has rotated 137° beyond the upper dead-center point in the expansion period corresponding to the positions of the pistons as shown in Figure 12 where the blow down for the exhaust is fully underway. The next heavy lines of scales 26ᵃ and 27ᵃ marked, respectively, 180° and 170°, indicate the positions of pistons 26 and 27, respectively, in the movement toward the positions shown in Figure 1 following the beginning of the exhaust period indicated in Figure 12, and at which point in Figure 1 the full scavenging action is underway. In this part of the movement of the pistons 26 and 27 from the position indicated in Figure 12 the piston 27 being in advance of piston 26 arrives at the limit of its power stroke at the point 170° indicated in scale 27ᵃ. As the yoke-block 33 moves with crank-pin 32 toward the lower dead-center point, piston 27 moves downward slightly below the line of exhaust ports, and then due to the accentric path of hinge-pin 35, moves upward to a point level with the lower edges of the exhaust ports as seen in Figure 1 while the piston 26 moves downward to level off with piston 27 at the 180° mark as indicated in scale 26ᵃ for the scavenging action indicated in Figure 1. At this point in the cycle of the crank-arm the yoke-block 33 is in its lower dead-center balanced position and as the upward or compression strokes of the pistons begin with the movement of the crank-pin 32 beyond the lower dead-center point the yoke-block tilts owing to its swivelling motion on crank-pin 32 and as indicated in Figure 2 starts the accelerated movement of piston 27 so that when the crank-arm 32 has travelled 233° the piston 27 will have fully covered the exhaust ports 16 for the start of the supercharging period while the inlet ports 15 will be only partly covered and the supercharging will still be in progress. This position of the pistons is indicated in Figure 14 by the heavy lines 233° in scale 27ᵇ and 26ᵇ, and during this phase of the movement the air turbulence is created by the accelerated movement of piston 27 and continues with the accelerated advance movement of piston 27 over piston 26 as the pistons approach the position shown in Figure 3 at which point piston 26 has fully covered the inlet ports 15 to end the supercharging period and begin compression. This point in the cycle is indicated by the heavy lines 248° in scales 26ᵇ and 27ᵇ. The compression period continues during the upward movement of the pistons to the point indicated by the heavy lines 330° in the scales corresponding to the position of the pistons indicated in Figure 4 at which point fuel injection occurs with further compression and turbulence. As the pistons approach the point indicated by the scale marks 350° in Figure 14, which corresponds to the position of the pistons as shown in Figure 5, initial fuel ignition occurs. Then as the crank-pin 32 approaches the upper dead-center point and the piston 27 is at the limit of its compression stroke, the rotation of the crank-arm in carrying the yoke-block to its upper balanced position of Figure 6, starts the downward or expansion stroke of piston 27, and the tilting of the yoke-block due to its swivelling motion on the crank-pin imparts the final upward compression drive to piston 26, thereby creating increased turbulence and forcing the ignited air and fuel mixture across the combustion chamber and into the clearance space above piston 27 and effecting complete ignition and the expansion or power drive of both pistons in unison from the point indicated in Figure 7. This period in the movement of the pistons from the points indicated by the scale marks 350° in both scales is illustrated on a larger scale in Figures 8 to 10, and as the yoke-block 33 with crank-pin 32 passes beyond the upper dead center from the position indicated in Figure 6 toward the position indicated in Figure 7 both pistons will move in unison in the power stroke and the action periods above explained are repeated. The scale points of Figure 14 are determined by and correspond with the degrees pointed off in the circular and elliptical paths of the crank-pin 32 and yoke-block hinge-pin 35 illustrated in Figure 15, and in Figure 15 the small circles 32 and 35 correspond to the crank-arm pin 32 and yoke-block hinge-pin 35 positions indicated by the heavy scale marks in Figure 14.

In Figures 16 to 19 the several periods in the functioning of the pistons are illustrated graphically. In these graphic illustrations the relative periodic positions of pistons 26 and 27 and the turbulent air and fuel mixture are indicated by the different shadings.

In Figure 16 which illustrates the compression period, pistons 26 and 27 are shown in the starting position of Figure 1, but after the yoke-block 33 has tilted over the lower dead center thereby drawing piston 26 ten degrees downward, piston 27 is started in the advanced movement for the compression stroke. In this figure the cross-hatching $a$ and $b$ indicate, respectively, the incoming air and exhaust of the scavenging period. As the pistons move upward to the position in which the crank-arm has rotated to the 233° mark indicated in Figure 2 the exhaust ports 16 will be covered by piston 27 and ports 15 and 15a will be about one-half covered by piston 26 to permit admission of the supercharging air current from duct 13 as indicated by the shading $c$. When pistons 26 and 27 arrive at the 248° mark corresponding to the positions of the pistons and crank-arm shown in Figure 3 air admission will be cut off and compression indicated by the shading $d$ in both cylinders begins. During this movement the piston 27 will have reached the 248° point in its cylinder in advance of piston 26, due to its accelerated movement, and owing to this advanced and accelerated movement air turbulence will be initiated and cause the air during compression to swirl back and forth through the cylinders and combustion chamber 21 as indicated by the arrows in Figure 3. When the pistons reach the 330° point corresponding to the positions of the pistons 26—27 and crank-arm 31 in Figure 4 fuel injection starts and mixture of the turbulent air and fuel is effected as the air is caused to surge back and forth across the combustion area as indicated by the horizontal dark shading $e$. This movement continues during the period of initial and complete fuel ignition corresponding to the movement of the mixture indicated by the arrows in Figures 5 to 10.

In Figure 17 which illustrates the expansion or power period, the dark vertical shading $f$ denotes the combustion and downward pressure upon the pistons as the yoke-block 33 tilts over the upper dead center corresponding to the positions of the pistons 26—27 and crank-arm 31 in Figure 7. In this graph the light vertical shade lines $g$ indicate the expansion period of Figure 11; the oblique shade lines $h$ indicate the blow-down period of Figure 12; and the cross-hatching lines $a$ and $b$, respectively, the incoming air and exhaust of the scavenging period of Figure 1.

Figures 18 and 19, respectively, illustrate graphically the circular movements of the crank-arms corresponding to the operating periods of pistons 26—27, and in these graphs the shadings indicated by reference letters $a$ to $h$ correspond to the shadings in Figures 16 and 17, and the arrows above Figures 18 and 19 indicate the direction of rotation of the crank-shaft.

It will be noted that in the travel of the pistons of each unit pair from the start of the expansion or power stroke the piston 27 has an advance movement imparted to it by the action of the yoke-block 33 from the position illustrated in Figures 5 and 8 to the point indicated in Figures 6 and 9 and that the travel is accelerated to the point of exhaust port uncovering as indicated in Figure 11. In this movement the piston 27 in its power stroke will have travelled a distance equal to a revolution of 104° of crank-arm 31, whereas the piston 26 from the position of Figure 7 to that of Figure 11 will have travelled in its power stroke a distance equal to a revolution of 94° of the crank-arm, that is, from the point of 10° in Figure 7 to 104° in Figure 11. From this point the travel of piston 27 decelerates, that is, from the beginning of exhaust port uncovering for the blow-down and exhaust from the point indicated in Figure 11 through the movement indicated in Figure 12 to the full uncovering of the inlet and exhaust ports for the scavenging action indicated in Figure 1. In this period piston 27 will have travelled a distance equal to the height of the exhaust ports or a distance equal to a crank-arm revolution of 76°, whereas the piston 26 during this interval will have travelled from the point indicated in Figure 11 to a point indicated in Figure 1, a distance approximately twice the distance travelled by piston 27 in that interval. Thus it will be seen that the functioning of the yoke-block 33 controls the timing for the uncovering of the ports 15 and 16 and the duration of the open port period. On the return stroke of the pistons 26 and 27, that is, during the supercharging period, the reverse relative rate of travel of the pistons takes place. The piston 27 starts upward with an advance movement at an accelerated rate from the position indicated in Figure 1 toward the position indicated in Figure 2, so that instead of the decelerated movement during the open period of exhaust ports 16 it now rapidly covers the exhaust ports during the 53° revolution of the crank-arm indicated in Figure 2, while the piston 26 travels during the same period of time a distance approximately one-half the height of the inlet ports for the supercharging period, and thereby controlling the timing of the covering of the exhaust ports and the duration of the open inlet period for supercharging. The accelerated travel of piston 27 continues during the supercharging period to create air turbulence and begins to decelerate again toward the end of the compression period indicated in Figure 5 and preparatory to the start of the expansion or power stroke and advance accelerated movement indicated in Figures 6 to 10. This completes the cycle and indicates how the entire cycle of operative periods, with the exception of fuel injection, is controlled by the functioning of the yoke-block coupling between the piston-rods of each unit pair of cylinders and the crank-arms.

What I claim is:

1. In a two-stroke high compression ignition engine, the combination of a pair of cylinders mounted astride the crank-shaft and the pistons of which operate as a unit, an unobstructed and unrestricted combustion chamber extending over said cylinders, a single centrally located spray nozzle for injecting combustible fuel under pressure directly into the compressed air in said chamber, a series of exhaust ports in horizontal radial alignment about the circumference of one of said cylinders, a series of inlet ports in horizontal radial alignment about the circumference of the other of said cylinders, a connecting port between the inlet and exhaust ports at the adjacent vertical mid-sections of said cylinders, the lower edges of said inlet and exhaust ports and said connecting port being in straight line alignment, flat-head pistons in said cylinders operating in unison and serving to cover and uncover said ports during each stroke, a single crank-shaft arm for the pair of pistons, a crank-arm yoke to which the piston rods are coupled in parallel relation, and the piston-rod of the piston for covering the exhaust ports being hinged to said yoke on a hinge-pin centered eccentrically to the crank-shaft and crank-pin centers, whereby the pistons are caused to level off in alignment with the lower edges of said ports at the end of the expansion stroke to effect a straight blow through from the air supply duct to the exhaust duct during the scavenging period.

2. A two-stroke high compression ignition engine as defined in claim 1, wherein the upper edges of the exhaust ports, connecting port and the adjacent inlet port are in horizontal alignment and extend above the height of the rest of the inlet ports, whereby the exhaust ports, connecting port and adjacent inlet port are caused to open simultaneously for the exhaust in advance of the opening of the inlet ports to permit blow down exhaust in both cylinders at the end of the expansion stroke in advance of the levelling of the piston-heads for straight blow through of air from the air supply duct to the exhaust duct causing suction effect during the scavenging period.

3. In a two-stroke high compression ignition engine, the combination of a pair of cylinders mounted astride the crank-shaft and operating as a unit, an unobstructed and unrestricted combustion chamber extending over said cylinders, air inlet ports located in horizontal radial alignment circumferentially in the wall of one cylinder and all communicating with an air duct, exhaust ports in horizontal radial alignment in the wall of the other cylinder of the pair and all communicating with an exhaust duct, a connecting port between adjacent ports of the pair of cylinders, a pair of flat-head pistons and piston-rods for said cylinders operating in unison and adapted to cover and uncover all said ports, the lower edges of all said ports being in straight line horizontal alignment and in alignment with the flat-heads of said pistons at the end of the expansion stroke, a driving connection between said pair of piston-rods and crank-shaft for causing the piston of the exhaust cylinder to reciprocate in advance of the piston of the inlet cylinder at a varying accelerating and decelerating rate relative to the reciprocation of the inlet cylinder piston during both strokes of the pistons, whereby the difference in the relative rate of travel of the pistons causes air turbulence in both cylinders during the supercharging period, turbulence of the air and fuel mixture in the combustion chamber, a back and forth surge of the fuel mixture during the ignition period, blow down exhaust in both cylinders at the end of the expansion period, turbulence of the incoming air and combustion products during the exhaust period, and straight blow through of air causing suction effect during the scavenging period.

References Cited in the file of this patent

UNITED STATES PATENTS

| | | |
|---|---|---|
| 1,746,876 | Thomson | Feb. 11, 1930 |
| 1,841,119 | Herr | Jan. 12, 1932 |
| 2,014,678 | Zoller | Sept. 17, 1935 |
| 2,443,502 | Guerasimoff | June 15, 1948 |

FOREIGN PATENTS

| | | |
|---|---|---|
| 142,971 | Great Britain | May 20, 1920 |
| 397,015 | Great Britain | Aug. 17, 1933 |
| 743,150 | France | Jan. 6, 1933 |